United States Patent
Kageyama et al.

(10) Patent No.: US 8,098,895 B2
(45) Date of Patent: Jan. 17, 2012

(54) LANE MARKER RECOGNITION APPARATUS AND LANE MARKER RECOGNITION METHOD USED BY SAID APPARATUS

(75) Inventors: Shioya Kageyama, Toyota (JP); Tomoyasu Tamaoki, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 207 days.

(21) Appl. No.: 12/690,641

(22) Filed: Jan. 20, 2010

(65) Prior Publication Data

US 2010/0189306 A1     Jul. 29, 2010

(30) Foreign Application Priority Data

Jan. 23, 2009   (JP) ................................. 2009-013173

(51) Int. Cl.
*G06K 9/00*   (2006.01)
(52) U.S. Cl. ........................................ 382/104; 382/260
(58) Field of Classification Search .................. 382/104, 382/199, 260, 286; 340/988; 701/23, 28
See application file for complete search history.

(56) References Cited

U.S. PATENT DOCUMENTS

| | | | | |
|---|---|---|---|---|
| 5,987,174 A * | 11/1999 | Nakamura et al. | ............ | 382/199 |
| 7,583,816 B2 * | 9/2009 | Kakinami et al. | ............ | 382/104 |
| 7,876,926 B2 * | 1/2011 | Schwartz et al. | ............ | 382/104 |
| 2005/0209748 A1 * | 9/2005 | Watanabe et al. | ............... | 701/23 |

FOREIGN PATENT DOCUMENTS

| | | |
|---|---|---|
| JP | 10-111939 A | 4/1998 |
| JP | 2002-197444 A | 7/2002 |
| JP | 2003-168198 A | 6/2003 |
| JP | 2003-178399 A | 6/2003 |
| JP | 2003-271930 A | 9/2003 |
| JP | 2005-141487 A | 6/2005 |
| JP | 2008-123348 A | 5/2008 |

OTHER PUBLICATIONS

Office Action issued Nov. 4, 2010, in Japan Patent Application No. 2009-013173 (with English translation).

* cited by examiner

*Primary Examiner* — Andrew W Johns
(74) *Attorney, Agent, or Firm* — Oblon, Spivak, McClelland, Maier & Neustadt, L.L.P.

(57) ABSTRACT

A lane marker recognition apparatus which recognizes a lane marker based on a captured image of a road surface in the direction in which a vehicle is traveling, includes recognizing means for recognizing at least one left lane marker and at least one right lane marker captured in the image, and generating lane marker information indicative of the recognized lane markers; calculating means for calculating, based on the lane marker information, at least one type of control value for each potential running lane demarcated; first selecting means for selecting a control value of one of the running lanes that is to be indicated as information; generating means for generating information indicative of the selected control value; and second selecting means for, after the information has been generated, selecting the control value of the potential running lane that is closest to the control value indicated by the information.

11 Claims, 6 Drawing Sheets

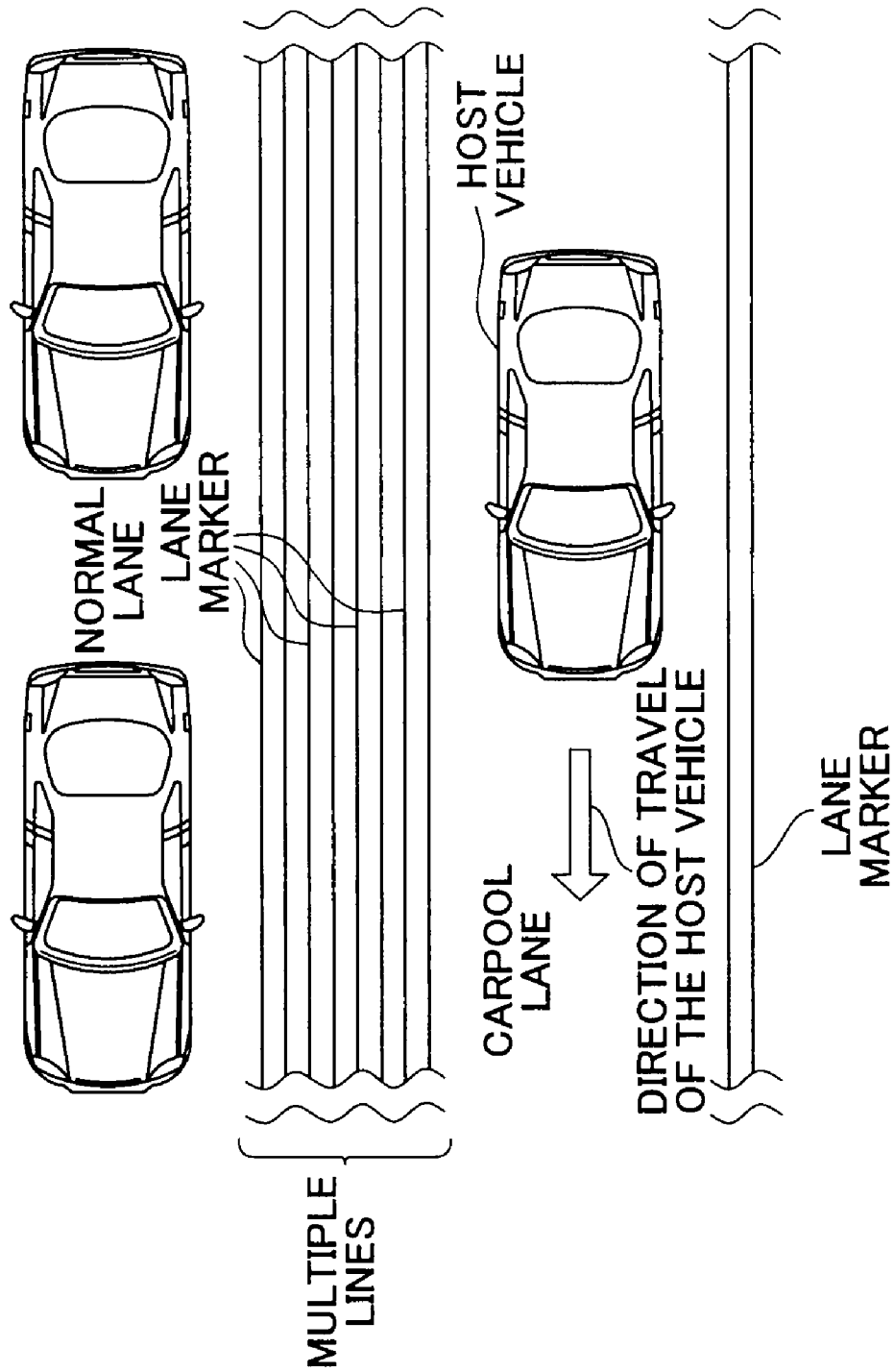

LANE MARKER RECOGNITION APPARATUS AND LANE MARKER RECOGNITION METHOD USED BY SAID APPARATUS

INCORPORATION BY REFERENCE

The disclosure of Japanese Patent Application No. 2009-013173 filed on Jan. 23, 2009, including the specification, drawings and abstract is incorporated herein by reference in its entirety.

BACKGROUND OF THE INVENTION

1. Field of the Invention

The invention relates to an apparatus that recognizes a lane marker on a road. More particularly, the invention relates to a lane marker recognition apparatus mounted in a vehicle.

2. Description of the Related Art

In recent years, lane marker recognition apparatuses which recognize a lane marker on a road on which a movable object such as a vehicle travels, based on a captured image of the road surface in the direction of travel, are being mounted in these movable objects (hereinafter simply referred to as vehicle). The lane marker recognition results of this kind of lane marker recognition apparatus are used as information for controlling the steering angle so that the host vehicle travels inside the running lane, for example. One example of this kind of lane marker recognition apparatus is the lane marker recognition apparatus described in Japanese Patent Application Publication No. 2003-271930 (JP-A-2003-271930) (hereinafter referred to as the "related art").

In the related art, a lane marker on a road on which a host vehicle is traveling recognized based on a processed image which is a captured image of the road surface in the direction in which the host vehicle is traveling, which has been processed. More specifically, a horizontal row of pixels of the processed image are scanned, and the upper edge and lower edge where the luminance value changes abruptly at the boundary between the road surface and the lane marker are detected. When both the upper and lower edges are detected over the entire region of the processed image, the related art recognizes the center position between the detected upper and lower edges as the position of the lane marker.

However, various problems which are described below arise with the related art. That is, with the related art, when there is noise in the processed image, it affects the processed image in such a way that the luminance values of the captured image and the processed image change. The related art recognizes the position of the lane marker based on the processed image that has been affected by the noise, so the accuracy of the recognition results of the lane marker position decreases. When the accuracy of the recognition results of the lane marker position decreases, the accuracy of the information used for the purposes described above decreases.

SUMMARY OF THE INVENTION

This invention proposes a lane marker recognition apparatus capable of generating information that is not affected by noise and is therefore more accurate.

A first aspect of the invention relates to a lane marker recognition apparatus which recognizes a lane marker based on a captured image of a road surface in the direction in which a vehicle is traveling. This lane marker recognition apparatus includes recognizing means for recognizing at least one left lane marker and at least one right lane marker captured in the image, and generating lane marker information indicative of the recognized lane markers; calculating means for calculating, based on the lane marker information, at least one type of control value for each potential running lane demarcated by a combination of the at least one left lane marker and the at least one right lane marker; first selecting means for selecting a control value of one of the potential running lanes that is to be indicated as information based on the lane marker information, from among the control values for the potential running lanes calculated by the calculating means; generating means for generating information indicative of the selected control value; and second selecting means for, after the information has been generated, selecting the control value of the potential running lane that is closest to the control value indicated by the information, from among the control values calculated for the potential running lanes by the calculating means.

With the lane marker recognition apparatus according to the first aspect of the invention, a control value calculated based on a false lane marker erroneously recognized as a lane marker or the like due to noise in the image or the like is not erroneously indicated as information, so processed information indicative of a more accurate control value can be generated.

A second aspect of the invention relates to a lane marker recognition method executed by a lane marker recognition apparatus which recognizes a lane marker based on a captured image of a road surface in the direction in which a vehicle is traveling. The lane marker recognition method includes recognizing at least one left lane marker and at least one right lane marker captured in the image, and generating lane marker information indicative of the recognized lane markers; calculating, based on the lane marker information, at least one type of control value for each potential running lane demarcated by a combination of the at least one left lane marker and the at least one right lane marker; selecting a control value of one of the potential running lanes that is to be indicated as information based on the lane marker information, from among the calculated control values for the potential running lanes; generating information indicative of the selected control value; and after the information has been generated, selecting the control value of the potential running lane that is closest to the control value indicated by the information, from among the calculated control values for the potential running lanes.

With the lane marker recognition method according to the second aspect of the invention, a control value calculated based on a false lane marker erroneously recognized as a lane marker or the like due to noise in the image or the like is not erroneously indicated as information, so processed information indicative of a more accurate control value can be generated.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein:

FIG. 5 is a view of an example of a passing lane assumed in this example embodiment.

DETAILED DESCRIPTION OF EMBODIMENTS

Figure 1:
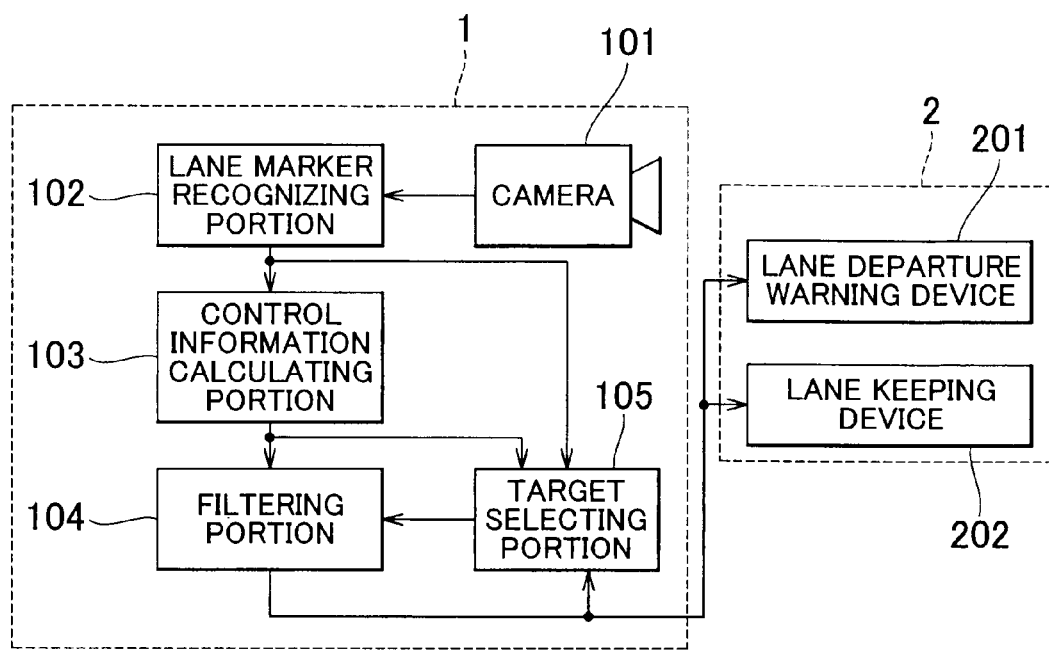
FIG. 1 is a block diagram schematically showing a lane marker recognition apparatus according to a first example embodiment of the invention, and a drive assist apparatus.

FIG. 1 is a block diagram schematically showing the structure of a lane marker recognition apparatus 1 according to a first example embodiment. The lane marker recognition apparatus 1 includes a camera 101, a lane marker recognizing portion 102, a control information calculating portion 103, a filtering portion 104, and a target selecting portion 105.

Figure 2A:
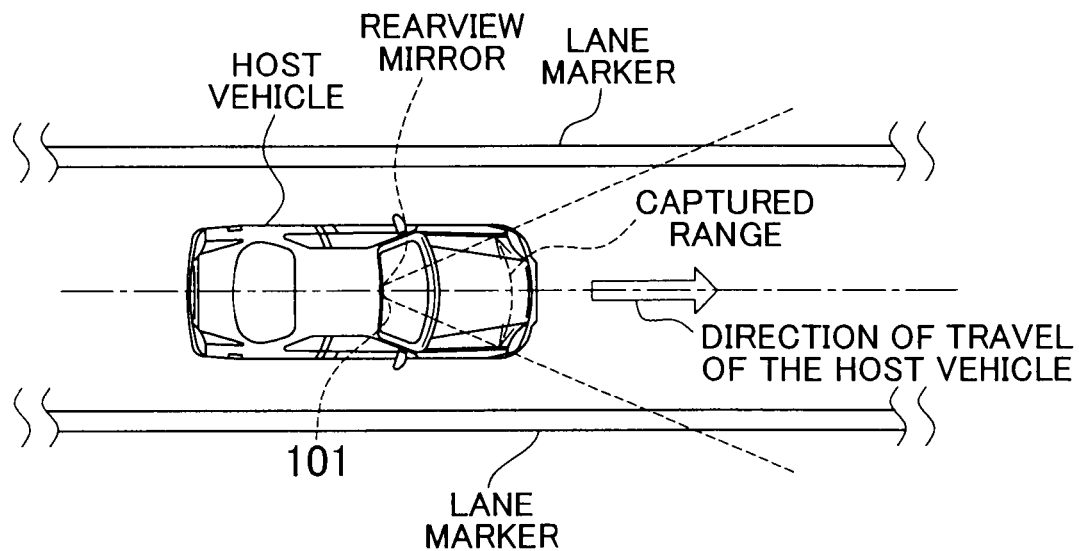
FIG. 2A is a view of an example mounting position of a camera.
Figure 2B:
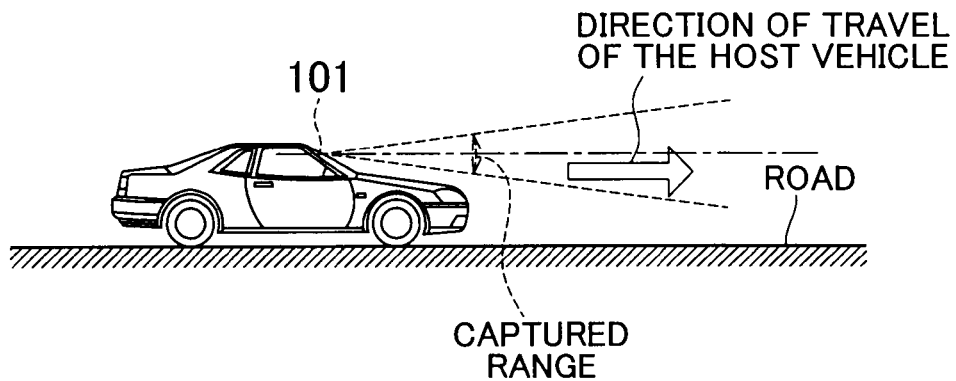
FIG. 2B is another view of the example mounting position of the camera.

The camera 101 is typically a CCD (Charge Coupled Device) camera or a CMOS (Complementary Metal Oxide Semiconductor) camera or the like. FIGS. 2A and 2B both show an example mounting position of the camera 101 in a host vehicle. FIG. 2A is a view from directly above the host vehicle while running, and FIG. 2B is a view from the right side of the host vehicle shown in FIG. 2A. The camera 101 is mounted on the rearview mirror of the host vehicle so as to be able to capture an image of the road surface in the direction of travel of the host vehicle. The camera 101 captures successive images (such as one frame per 1/24 seconds) in the direction in which the host vehicle is traveling, as shown in FIGS. 2A and 2B, and generates image data indicative of the captured image every time an image is captured. The imaging range of the camera 101 includes at least left and right lane markers on the road traveled by the host vehicle, as shown in FIGS. 2A and 2B.

Incidentally, the mounting position of the camera 101 shown in FIGS. 2A and 2B is only an example. The camera 101 may be mounted anywhere on the host vehicle as long as at least the left and right lane markers are in the image captured by the camera 101 and the lane markers can be recognized by the lane marker recognizing portion 102 which will be described later.

The lane marker recognizing portion 102 obtains the generated image data when it is generated by the camera 101. The lane marker recognizing portion 102 the successively recognizes the lane markers captured in the obtained image data using a suitable well-known method, based on the image data each time it is obtained.

More specifically, when the lane marker recognizing apparatus 102 obtains the image data, it recognizes two or more lane markers captured in the obtained image data using a suitable well-known method. When the lane marker recognizing portion 102 recognizes two or more lane markers, the lane marker recognizing portion 102 detects each pixel in a predetermined row of pixels in the horizontal direction of the image indicated by the image data, from among the pixels showing the recognized lane markers. Then the lane marker recognizing portion 102 recognizes the lane marker indicated by the pixels to the left of the center in the horizontal direction of the image from among the detected pixels as the lane marker to the left of the host vehicle, and recognizes the lane marker indicated by the pixels to the right of the center in the horizontal direction of the image from among the detected pixels as the lane marker to the right of the host vehicle. Each time the lane marker recognizing portion 102 recognizes at least one lane marker to the left of the host vehicle and at least one lane marker to the right of the vehicle, the lane marker recognizing portion 102 generates lane marker information that correlates the position on the image of all of the pixels indicating each recognized lane marker with information indicating whether the lane marker is to the left or the right of the host vehicle.

Incidentally, the method used to determine whether a lane marker recognized by the lane marker recognizing portion 102 is to the left or right of the host vehicle is not limited to the method described above. That is, any appropriate method may be used. Also, the position of the pixels on the image indicated by the lane marker information may also be a position on the image that is indicated by an X-Y coordinate system which is based on a predetermined point of origin.

Figure 3:
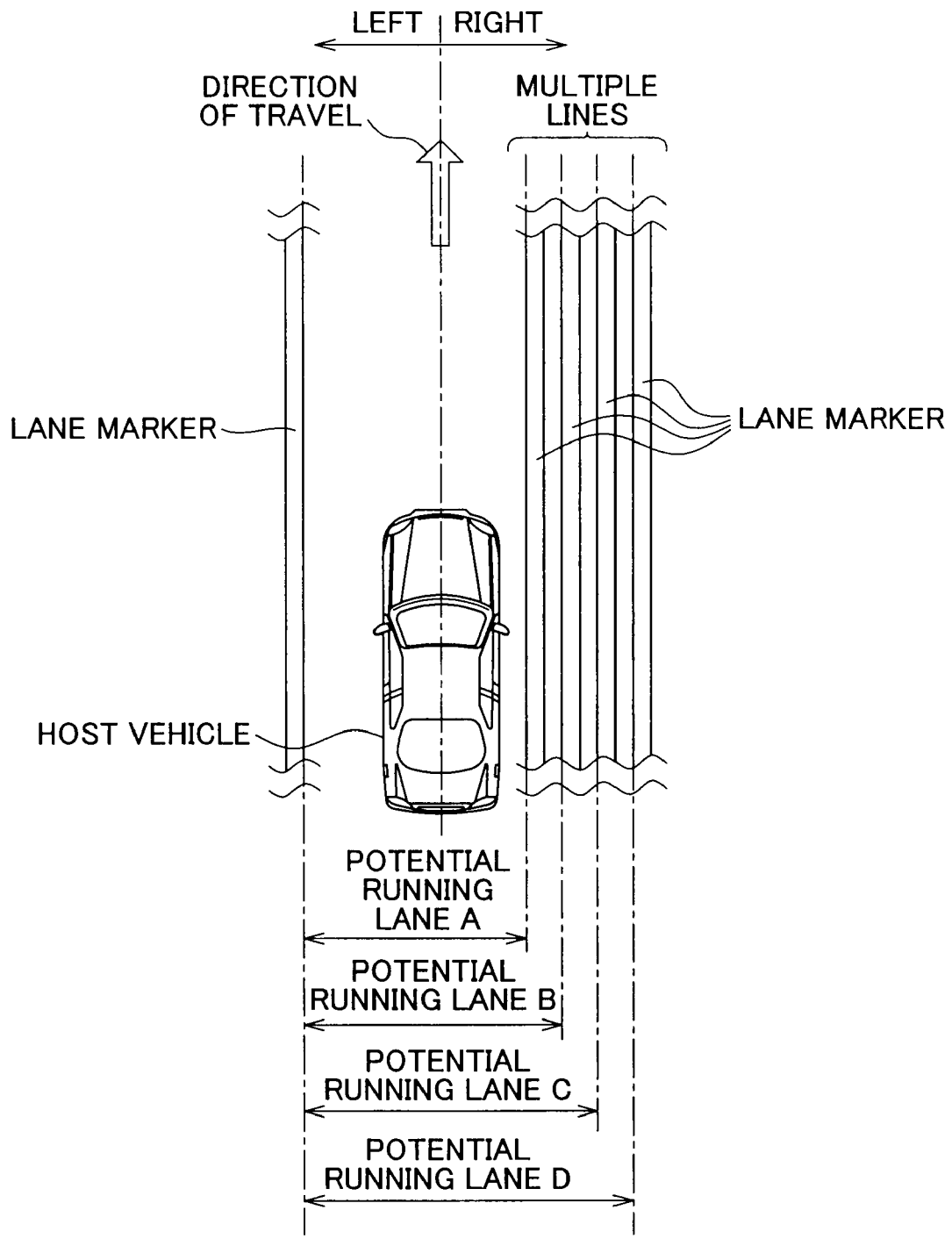
FIG. 3 is a view of a running lane of the example embodiment.

When the lane marker information is generated by the lane marker recognizing portion 102, the control information calculating portion 103 then obtains this generated lane marker information. Once the lane marker information is obtained, the control information calculating portion 103 calculates control values for all of the potential running lanes (i.e., at least one control value for each potential running lane) created by all possible combinations of lane markers that include at least one left lane marker and at least one right lane marker indicated by the obtained lane marker information. FIG. 3 is a view showing four potential running lanes, i.e., potential running lanes A to D, as examples of potential running lanes in this example embodiment. In the example shown in FIG. 3, the intervals that are demarcated by the innermost sides of the combinations of lane markers are shown as the potential running lanes, but different intervals may also be used as the potential running lanes, such as intervals that are demarcated by the centers in the width direction of the combinations of lane markers. Incidentally, in the example shown in FIG. 3, passing lanes indicated by multiple lines formed of a plurality of lane markers are shown to the right of the host vehicle as an example of a passing lane assumed in this example embodiment. The example of a passing lane assumed in this example embodiment will be described later.

Lane width, offset, curvature radius, yaw angle, and pitch angle and the like are all examples of types of control valves calculated by the control information calculating portion 103 according to this example embodiment.

The lane width is the interval in the width direction of the potential running lane described above. When calculating the lane width, the control information calculating portion 103 detects, based on the lane marker information, the number of pixels between the pixels indicating the left lane marker and the pixels indicating a right lane marker in the horizontal direction of the image, in a predetermined row of pixels in the horizontal direction of the image indicated by the image date, for each potential running lane. Once the control information calculating portion 103 detects the number of pixels between the pixels indicating the left lane marker and the pixels indicating the right lane marker in the horizontal direction in the image for each potential running lane, the control information calculating portion 103 then calculates the lane width by performing a computation that converts the number of pixels detected for each potential running lane into distance using a method such as multiplying the number of pixels detected for each potential running lane by a predetermined constant. Incidentally, one example of the number of pixels between the pixels indicating the left lane marker and the pixels indicating the right lane marker in the horizontal direction of the image when the control information calculating portion 103 calculates the lane width is the number of pixels between the innermost pixels, in a predetermined row of pixels in the horizontal direction of the image, of the pixels indicating the right lane marker and the pixels indicating the left lane marker.

Also, the offset is the distance from the center of the potential running lane in the width direction to the center of the host vehicle in the width direction. When calculating the offset, the control information calculating portion 103 detects, based on the lane marker information, the number of pixels between the centers, in the horizontal direction (i.e., the width direction) of the image, of the pixels indicating the left lane marker and the pixels indicating the right lane marker in a predetermined row of pixels in the horizontal direction of the image indicated by the image date, and the center, in the horizontal direction, of the image indicated by the image data, for each potential running lane. Once the number of pixels between the centers, in the horizontal direction (i.e., the width direction) of the image, of the pixels indicating the left lane marker and the pixels indicating the right lane marker, and the center, in the horizontal direction, of the image indicated by the image data is detected for each potential running lane, the control information calculating portion 103 calculates the offset for each potential running lane by performing a computation that converts the number of pixels detected for each potential running lane into distance using a method such as multiplying the number of pixels detected for each potential running lane by a predetermined constant.

Also, the curvature radius is the curvature radius in the direction in which the potential running lane curves. When calculating the curvature radius, the control information calculating portion 103 detects the shapes on the image of the pixels indicating the left lane marker and the pixels indicating the right lane marker for each potential running lane based on the lane marker information. Once the shapes on the image of the pixels indicating the left lane marker and the pixels indicating the right lane marker are detected, the control information calculating portion 103 then detects the shape of a center line that passes through the center in the width direction between the left and right lane markers, for example, based on the detected shapes. Then the control information calculating portion 103 calculates the curvature radius for each potential running lane by performing a calculation to obtain the radius of a circle that is closest to the shape of the shape of the detected center line.

Also, the yaw angle is a rotation angle of the host vehicle about an axis that passes vertically through the center of gravity of the host vehicle and which is based on the direction of the potential running lane. When calculating the yaw angle, the control information calculating portion 103 detects the shapes on the image of the pixels indicating the left lane marker and the pixels indicating the right lane marker for each potential running lane based on the lane marker information. Once the shapes on the image of the pixels indicating the left lane marker and the pixels indicating the right lane marker are detected, the control information calculating portion 103 then detects the amount of change between the detected shapes and shapes on the image of the pixels indicating the left lane marker and the pixels indicating the right lane marker of a potential running lane when the host vehicle is pointed in the direction of the potential running lane, which have been stored in advance in a storage portion, not shown. Then the control information calculating portion 103 calculates the yaw angle for each potential running lane by performing a computation that converts that detected amount of change into the yaw angle.

Also, the pitch angle is a slope angle in the longitudinal direction of the host vehicle with respect to the road surface on which the left and right lane markers that indicate the running lane are drawn. When calculating the pitch angle, the control information calculating portion 103 first detects the shapes on the image of the pixels indicating the left lane marker and the pixels indicating the right lane marker for each potential running lane based on the lane marker information. Once the shapes on the image of the pixels indicating the left lane marker and the pixels indicating the right lane marker are detected, the control information calculating portion 103 then detects the amount of change between the detected shapes and shapes on the image of the pixels indicating the left lane marker and the pixels indicating the right lane marker of a potential running lane when the pitch angle of the host vehicle is zero, which have been stored in advance in a storage portion, not shown. The control information calculating portion 103 then calculates the pitch angle for each potential running lane by performing a computation that converts that detected amount of change into the pitch angle.

The control information calculating portion 103 calculates at least one type of control value from among the control values described above (i.e., the lane width, the offset, the curvature radius, the yaw angle, and the pitch angle), for each potential running lane based on the lane marker information. When calculating the control value, the control information calculating portion 103 generates, for each potential running lane, control information that correlates the potential running lane for which the control value has been calculated with the calculated control value. The control value indicated by the control information is filtered by the filtering portion 104, as will be described later, and used for control processing by devices provided in a drive assist system 2system 2 which will also be described later. Incidentally, the methods by which the control information calculating portion 103 calculates the lane width, the offset, the curvature radius, the yaw angle, and the pitch angle are not limited to those described above, but may be any suitable well-known method.

Once the control information is generated by the control information calculating portion 103, the filtering portion 104 is assigned a potential running lane selected by the target selecting portion 105, which will be described later, from among the generated control information. The filtering portion 104 then generates processed information indicative of a processed value obtained by filtering and smoothing the control values corresponding to the assigned potential running lane.

A Kalman filter is one example of a filter that may be used as the filtering portion 104 according to this example embodiment. Using a Kalman filter to perform the well-known filter process of estimating the current state enables the filtering portion 104 to accurately estimate the actual control value as the processed value even if there is dispersion in the control value of the potential running lane to be filtered, due to noise in the image data or in the image indicated by the image data.

When the lane marker information is generated by the lane marker recognizing portion 102, the target selecting portion 105 obtains the generated lane marker information. Also, when the control information is generated by the control information calculating portion 103, the target selecting portion 105 obtains the generated control information. The target selecting portion 105 selects the potential running lane of the control value to be filtered from among the potential running lanes indicated by the control information generated by the control information calculating portion 103 each time the lane marker information and the control information are obtained, and assigns the selected potential running lane to the filtering portion 104.

More specifically, when the lane marker information and the control information are first obtained, the target selecting portion 105 performs a first selection process in which it selects a potential running lane demarcated by a combination of a predetermined given left lane marker and a predetermined given right lane marker, from among the potential running lanes indicated by the control information generated by the control information calculating portion 103. In this case, the potential running lane demarcated by the combination of a predetermined given left lane marker and a predetermined given right lane marker is a potential running lane demarcated by the combination of either the left or right lane marker that is closest to the host vehicle and the lane marker on the other side that is nth closest to the host vehicle (where n is a predetermined integer of 2 or higher).

When performing the first selection process, the target selecting portion 105 detects the pixels in a predetermined row of pixels in the horizontal direction of the image indicated by the image data, from among the pixels for each left and right lane marker indicated by the lane marker information, based on the lane marker information generated by the lane marker recognizing portion 102. Then the lane marker recognizing portion 102 orders the pixels for each detected left and right lane marker from 1st to nth, on both the left and the right, from the pixel closest to the center in the horizontal direction of the image. The target selecting portion 105 then orders the lane markers indicated by the lane marker information on both the left and right sides from 1st to nth according to how close they are to the host vehicle. Once both the left and right lane markers have been ordered, the target selecting portion 105 selects the potential running lane demarcated by predetermined given left and right lane markers based on the order results.

The reason for the target selecting portion 105 selecting the potential running lane that is demarcated by the combination of either the left or right lane marker that is closest to the host vehicle and the lane marker on the other side that is nth closest to the host vehicle (where n is an integer of 2 or higher) when the target selecting portion 105 performs the first selection process in this way will now be described with reference to FIGS. 4A and 4B.

Figure 4A:
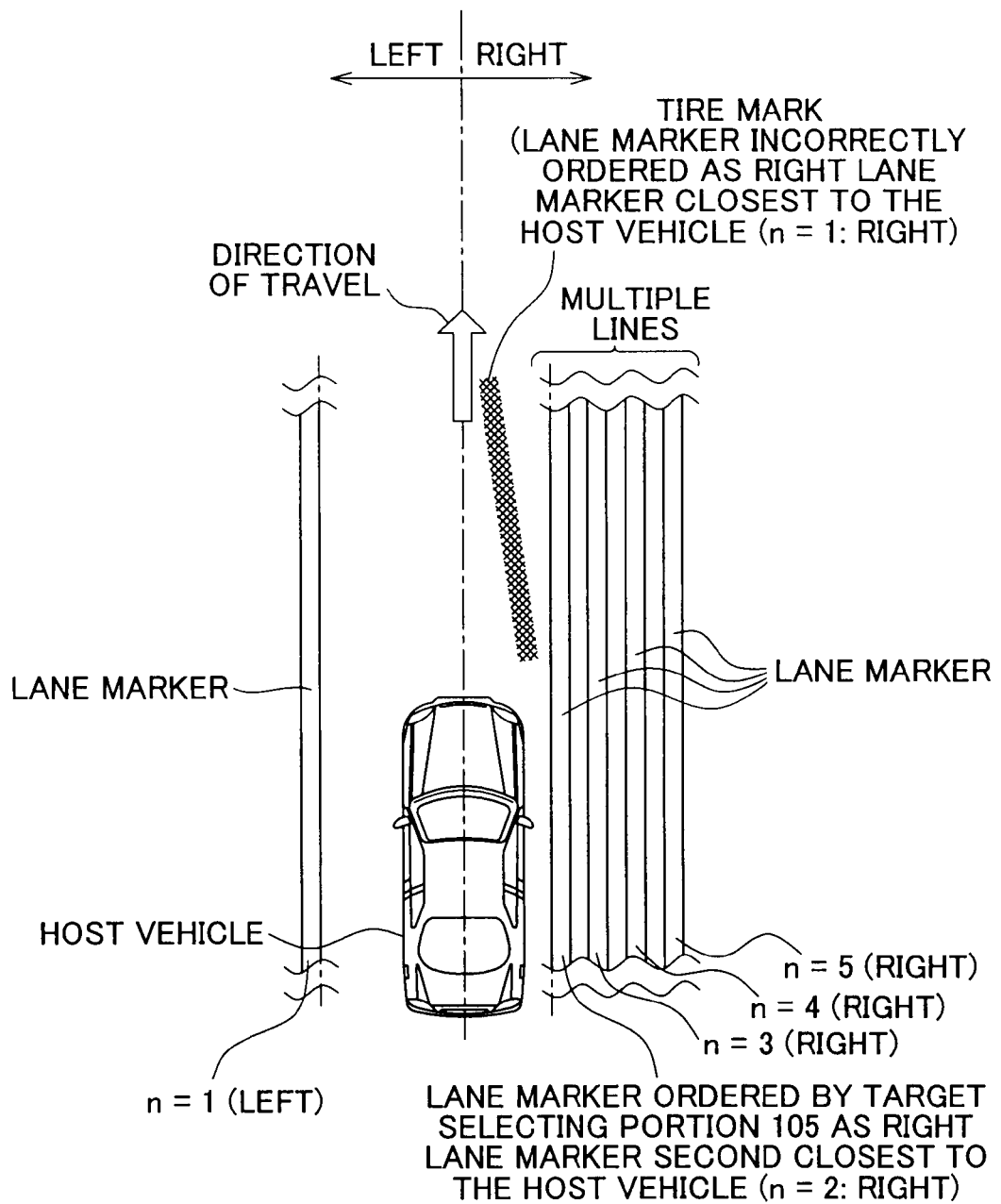
FIG. 4A is a view of an example of a tire mark erroneously recognized as a lane marker.
Figure 4B:
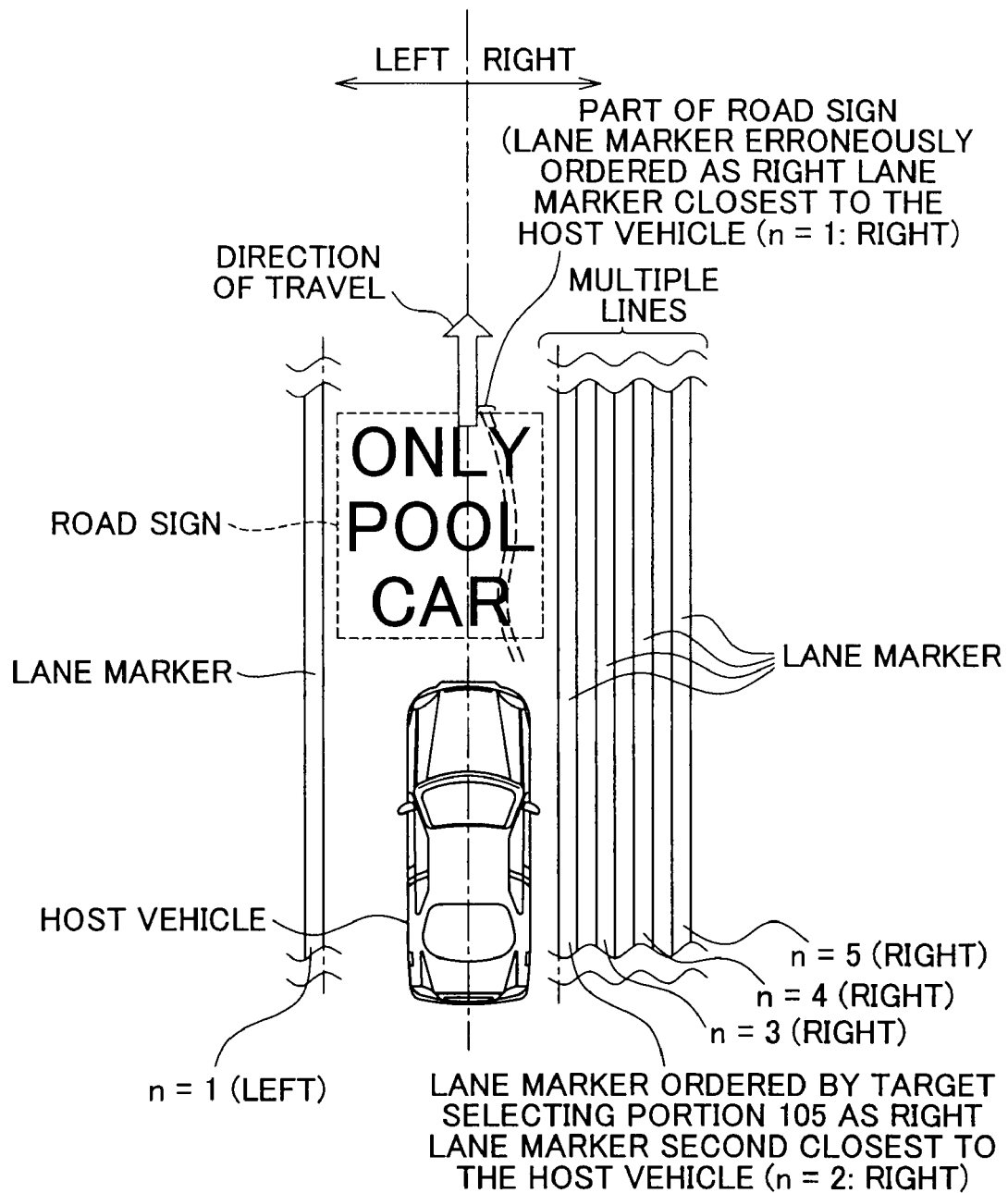
FIG. 4B is a view of an example of a sign on the road surface that is erroneously recognized as a lane marker.

FIG. 4A is a view of an example of a tire mark on the surface of the road on which the host vehicle is traveling, and FIG. 4B is a view of an example of a sign on the surface of the road on which the host vehicle is traveling (hereinafter simply referred to as a "road sign"). Incidentally, in the examples shown in FIGS. 4A and 4B, passing lanes indicated by multiple lines formed of a plurality of lane markers are shown to the right of the host vehicle as an example of a passing lane assumed in this example embodiment. The example of a passing lane assumed in this example embodiment will be described later.

When there is a tire mark to the right of the host vehicle on the surface of the road on which the host vehicle is traveling, as shown in FIG. 4A, the lane marker recognizing portion 102 may erroneously recognize that tire mark as the right lane marker that is closest to the host vehicle. Also, when there is a road sign on the surface of the road on which the host vehicle is traveling, the lane marker recognizing portion 102 may erroneously recognize part of that road sign as the right lane marker that is closest to the host vehicle, as shown by the example in FIG. 4B. Incidentally, in this specification, a tire mark or part of a road sign or the like that is erroneously recognized as a lane marker will be referred to as a "false lane marker".

If lane marker information indicative of a false lane marker is generated by the lane marker recognizing portion 102 and the target selecting portion 105 selects the running lane demarcated by that false lane marker, processed information indicating a processed value obtained as a result of the control value of the running lane that is demarcated by the false lane marker being filtered by the filtering portion 104 will be generated. As a result, the devices in the drive assist system 2system 2, which will be described later, will operate incorrectly. The same may also happen if the lane marker recognizing apparatus 102 erroneously recognizes a tire mark or part of a road sign as the left lane marker that is closest to the host vehicle, which is the opposite of the examples shown in FIGS. 4A and 4B.

Therefore, the target selecting portion 105 according to this example embodiment selects, as the filtering target of the filtering portion 104, the control value of the potential running lane demarcated by the combination of either the left or right side lane marker that is closest to the host vehicle and lane marker on the other side that is the nth closest to the host vehicle (where n is an integer of 2 or higher), in the first selection process so that the target selecting portion 105 does not select, as the filtering target of the filtering portion 104, the false left or right lane marker that is closest to the host vehicle of the host vehicle and the lane marker on the other side that is closest to the host vehicle.

As a result, assuming a case in which there is a tire mark to the right of the host vehicle on the road on which the host vehicle is traveling, as shown in the example in FIG. 4A, for example, when the lane marker recognizing portion 102 recognizes a plurality of lane markers to the right of the host vehicle, the target selecting portion 105 is preset to select the potential running lane demarcated by the left lane marker that is closest to the host vehicle and a right lane marker that is nth closest to the host vehicle (where n is a predetermined integer of 2 or higher). As a result, even if the lane marker recognizing portion 102 has erroneously recognized a tire mark as the right lane marker that is closest to the host vehicle, the target selecting portion 105 is prevented from erroneously selecting the potential running lane demarcated by that tire mark (i.e., a false lane marker). This also applies to a case in which part of a road side is erroneously recognized as a right lane marker, as described above with reference to FIG. 4B.

Also, opposite the case described above with reference to FIG. 4A, for example, assuming a case in which there is a tire mark to the left of the host vehicle on the road on which the host vehicle is traveling, when the lane marker recognizing portion 102 recognizes a plurality of lane markers to the left of the host vehicle, the target selecting portion 105 is preset to select the potential running lane demarcated by the right lane marker that is closest to the host vehicle and a left lane marker that is nth closest to the host vehicle (where n is a predetermined integer of 2 or higher). As a result, even if the lane marker recognizing portion 102 has erroneously recognized a tire mark as the left lane marker that is closest to the host vehicle, the target selecting portion 105 is prevented from erroneously selecting the potential running lane demarcated by that tire mark (i.e., a false lane marker). This also applies to a case in which part of a road side to the left of the host vehicle is erroneously recognized as a left lane marker, which is opposite the case described above with reference to FIG. 4B. The selection process of the target selecting portion 105 according to this example embodiment is as described above.

Incidentally, the reason that the target selecting portion 105 is able to select the control value of the potential running lane demarcated by the combination of either the left or right lane marker that is closest to the host vehicle and the lane marker on the other side that is the nth closest to the host vehicle (where n is a predetermined integer of 2 or higher), as described above, is because there may be a case in which two or more lane markers on at least one of the left or right side are recognized by the recognizing portion 102. In contrast, when only one right lane marker and only one left lane marker are recognized by the lane marker recognizing portion 102, the target selecting portion 105 selects the control value of the potential running lane demarcated by those two lane markers in the first selection process.

Next, a second selection process of the target selecting portion 105 according to this example embodiment will be described. When the control value of the potential running lane selected according to the first selection process of the target selecting portion 105 is filtered by the filtering portion 104, processed information is generated, and then the lane marker information and the control information are obtained, the target selecting portion 105 performs a second selection process in which it selects, as the filtering target, the potential running lane of the control value that is closest to the processed value indicated by the generated processed information, from among the potential running lanes indicated by the control information generated by the control information calculating portion 103.

More specifically, when the control information calculating portion 103 calculates one type of control value for each potential running lane, the filtering portion 104 generates processed information indicating a processed value obtained as a result of filtering the control value of the potential running lane selected in the first selection process of the target selecting portion 105 as described above. Then after the control value selected in by the first selection process is filtered and the processed information generated, the target selecting portion 105 compares the control value for each potential running lane calculated by the control information calculating portion 103 with the processed value indicated by the processed information generated by the filtering portion 104, and selects the potential running lane of the control value that is closest to the processed value.

Also, for example, when the control information calculating portion 103 calculates two or more types of control values for each potential running lane, the filtering portion 104 generates processed information indicative of two or more types of processed values obtained by filtering two or more types of control values of the potential running lane selected by the first selection process of the target selecting portion 105 as described above. Then after the control value of the potential running lane selected by the first selection process is filtered by the filtering portion 104 and the processed information is generated, the target selecting portion 105 compares the two or more types of control values for each potential running lane indicated by the control information generated by the control information calculating portion 103 with the two or more types of processed values indicated by the processed information generated by the filtering portion 104, and selects the potential running lane indicative of the control value that is closest to the processed value.

In the second selection process when the control information calculating portion 103 calculates two or more types of control values for each potential running lane, the target selecting portion 105 may, for example, compare a predetermined type of control value with a predetermined type of processed value from among type or more types of control values for each potential running lane and two or more types of processed values indicated by the processed information, and select the control value closest to the processed value as the potential running lane.

Also, when the control information controlling portion 103 calculates two or more types of control values for each potential running lane, the target selecting portion 105 may also calculates the degree of similarity between the two or more types of processed values indicated by the processed information and the control values, for example. More specifically, the target selecting portion 105 calculates the degree of similarity between one type of control value of one potential running lane indicated by the control information generated by the control information calculating portion 103 and the same type of processed value indicated by the processed information generated by the filtering portion 104, for two or more types of control values and two or more types of processed values. In this case, the degree of similarity of the control value may be any type of value as long as it is a value that indicates how close one type of control value is to the same type of processed value. For example, the degree of similarity of the control value may be the absolute value of the difference of the one type of control value minus the same type of processed value.

When calculating the degree of similarity of the control value described above for each of two or more types of control values for each potential running lane indicated by the control information, the target selecting portion 105 calculates the sum of the degrees of similarity of the two or more types of control values of one potential running lane as the degree of similarity of the potential running lane. When calculating the degree of similarity of each potential running lane indicated by the control information, the target selecting portion 105 may also select the running lane with the smallest calculated degree of similarity of the potential running lane as the potential running lane indicative of the control value closest to the processed value indicated by the processed information.

As described above, the lane marker recognizing portion 102 successively recognizes a lane marker based on the image captured by the camera 101. However, there is noise in the image captured by the camera 101 or in the image data obtained by the lane marker recognizing portion 102. Therefore, when the lane marker that is recognized by the lane marker recognizing portion 102 is recognized by the lane marker recognizing portion 102 the next time, it may be erroneously recognized as another lane marker even though it is the same lane marker. As a result, for example, the lane marker determined to be the right lane marker closest to the host vehicle according to the previous order by the target selecting portion 105 may erroneously be determined to the right lane marker that is second closest to the host vehicle according to the next recognition. When the same lane marker is erroneously determined to be another lane marker, the target selecting portion 105 may not be able to select the control value of the same running lane as the first selected running lane the next time even if the target selecting portion 105 repeatedly repeats the first selection process and continues to select the control value of the running lane.

Therefore, when target selecting portion 105 according to this example embodiment first selects the running lane according to the first selection process as described above and then selects the running lane after the control value of the selected running lane has been filtered by the filtering portion 104 and the processed information has been generated, the target selecting portion 105 performs the second selection process in which it selects the running lane indicative of the control value that is closest to the processed value that has been filtered by the filtering portion 104. After performing the first selection process, the target selecting portion 105 according to this example embodiment is able to continuously select the control value of the same running lane as the running lane that was first selected by the first selection process, without being affected by the noise in the data or the image captured by the camera 101, by repeating the second selection process.

Incidentally, in the example described above, the target selecting portion 105 selects the running lane with the smallest calculated degree of similarity of the running lane in the second selection process as the running lane indicative of the control value that is closest to the processed value indicated by the processed information. However, the target selecting portion 105 may also calculate the degree of similarity of the control value in the second selection process by a method such that the value of one type of control value and the value of the same type of processed value become greater as they approach one another, and the target selecting portion 105 may select the running lane with the highest degree of similarity of the running lane as the running lane indicative of the control value that is closest to the processed value indicated by the processed value.

Also, the start timing of the first selection process of the target selecting portion 105 described above is arbitrary. That is, the first selection process of the target selecting portion 105 described above may start, for example, at substantially the same time that the lane marker recognition apparatus 1 starts to operate, when a plurality of lane markers are recognized by the lane marker recognizing portion 102 on either the right or the left side, when the ignition switch of the host vehicle is turned on, or after the second selection process has been repeated after a predetermined period of time.

Next, the passing lane assumed in this example embodiment will be described. A carpool lane, which is well known in the United States, for example, is one example of the passing lane assumed in this example embodiment. A carpool lane is typically a lane provided on the left in the direction of normal lane travel. The carpool lane is separated from normal lanes that are to the right of a host vehicle that is traveling in the carpool lane, by multiple lines formed by a plurality of lane markers.

The multiple lines are such that the interval between adjacent lane markers is relatively narrow, as is evident from FIG. 5, and the effect from noise described above makes it likely that the target selecting portion 105 will erroneously determine the lane marker of the one potential running lane to be a lane marker of another potential running lane (i.e., erroneously change the order of two adjacent lane markers) when ordering the lane markers the next time. However, according to the lane marker recognition apparatus 1 according to this example embodiment, after the target selecting portion 105 selects the potential running lane by the first selection process and processed information which is indicative of a processed value obtained by filtering the control value of the selected potential running lane with the filtering portion 104 has been generated, the target selecting portion 105 selects, in the second selection process, the potential running lane indicative of the control value that is closest to the processed value indicated by the processed information, from among the potential running lanes indicated by the control information generated by the control information calculating portion 103. As a result, the control value of a potential running lane that has been selected once can continue to be filtered even if the host vehicle is traveling in a passing lane that is divided by multiple lines as shown in FIG. 5, for example.

Incidentally, the target selecting portion 105 may also perform the first and second selection processes when the host vehicle is traveling in a lane specified as a carpool lane or the like described above. For example, the target selecting portion 105 may also start the first selection process, select a potential running lane, and then perform the second selection process as described above when the number of lane markers to either the left or the right of the host vehicle is a predetermined number greater than the number of lane markers on the other side, based on the lane marker information generated by the lane marker recognizing portion 102.

When the host vehicle is traveling in a passing lane such as a carpool lane described above, the speed at which the host vehicle is traveling may be relatively high compared to the speed at which other vehicles in an adjacent normal lane are traveling. Therefore, the target selecting portion 105 performs the second selection process after selecting the potential running lane in the first selection process as described above when the number of lane markers to either the left or the right of the host vehicle is a predetermined number greater than the number of lane markers on the other side, based on the lane marker information generated by the lane marker recognizing portion 102. As a result, even if the host vehicle is traveling in a passing lane such as a carpool lane, it is possible to prevent the control value of a potential running lane that is demarcated by an incorrectly ordered lane marker from being filtered, which in turn makes it possible to prevent the devices in the drive assist system 2, which will be described later, from operating erroneously based on the control value of the erroneous running lane.

Next, the drive assist system 2 according to this example embodiment will be described. In the host vehicle of this example embodiment, the drive assist system 2 that assists the driver with safe driving is connected to the output side of the lane marker recognition apparatus 1, as shown in FIG. 1, for example. This drive assist system 2 includes a lane departure warning device 201 and a lane keeping device 202.

The lane departure warning device 201 obtains the processed information when it is generated by the filtering portion 104. Once the processed information is obtained, the lane departure warning device 201 determines whether there is a possibility that the host vehicle may veer out of its lane (i.e., lane departure) based on the obtained processed information. If, the lane departure warning device 201 determines that there is a possibility of lane departure, it notifies the driver.

More specifically, the lane departure warning device 201 notifies the driver that the host vehicle may veer out of its lane when the interval between the host vehicle and either the left or right lane marker becomes equal to or less than a predetermined threshold value based on the lane width and the offset, both of which are indicated by processed values from the obtained processed information. More specifically, the lane departure warning device 201 notifies the driver that the host vehicle may veer out of its lane when the interval between the host vehicle and either the left or right lane marker of the running lane becomes equal to or less than a predetermined threshold value based on a processed value obtained by filtering the control values of the potential running lane selected by the target selecting portion 105 (in this case the lane width and the offset) using the filtering portion 104. Incidentally, when the driver assist system 2 includes the lane departure warning device 201, the control information calculating portion 103 must calculate at least the lane width and the offset as control values.

The lane departure warning device 201 is controlled based on the processed values (in this case the lane width and the offset) indicated by the processed information generated by the lane marker recognition apparatus 1 according to this example embodiment. Therefore, the driver is prevented from being erroneously notified that the host vehicle may veer out of its lane based on the processed values obtained by filtering the control values of a potential running lane demarcated by an erroneously ordered lane marker.

The lane keeping device 202 obtains the processed information when it is generated by the filtering portion 104. Once the processed information is obtained, the lane keeping device 202 generates steering torque for steering the steered wheels so that the offset indicated by the obtained processed information becomes zero, such that the host vehicle constantly travels along the center in the width direction of the lane. More specifically, the lane keeping device 202 performs control to generate steering torque for steering the steered wheels, for example, such that the filtered offset becomes zero based on the offset (i.e., processed value) obtained by filtering the offset indicated as a control value of the potential running lane selected by the target selecting portion 105 using the filtering portion 104. Incidentally, when the drive assist system 2 includes the lane keeping device 202, the control information calculating portion 103 must calculates at least the offset as a control value.

The lane keeping device 202 is controlled based on the processed value (in this case the offset) indicated by the processed information generated by the lane marker recognition apparatus 1 according to the example embodiment. Therefore, incorrect steering torque is prevented from being generated based on a processed value obtained by filtering the control value of a potential running lane demarcated by an erroneously ordered lane marker.

As described above, devices for assisting the driver with safe driving using processed values (i.e., filtered control values) indicated by processed information, such as the lane departure warning device 201 and the lane keeping device 202 may be connected to the output side of the lane marker recognition apparatus 1 according to this example embodiment. In this case as well, with the lane marker recognition apparatus 1 according to this example embodiment, the target selecting portion 105 performs the first and second selection processes described above. As a result, it is possible to prevent a potential running lane demarcated by a lane marker that has been erroneously ordered due to noise in the image indicated by the image data or noise in the image data or the like from being erroneously selected, and thus possible to the prevent devices in the drive assist system 2 from performing incorrect control based on processed information indicative of a processed value obtained by filtering the control value of an erroneous running lane.

The lane marker recognition apparatus 1 according to the first example embodiment of the invention is as described above. With the lane marker recognition apparatus 1 according to this example embodiment, a control value that is close to the processed value indicated by the processed information obtained by filtering the control information for each potential running lane calculated by the control information calculating portion 103 is filtered. Therefore, the control value of a potential running lane demarcated by a lane marker that had been incorrectly ordered due to noise in the image or noise in the image data is not filtered, so processed information indicative of a more accurate processed value can be generated.

Incidentally, in the description of the first example embodiment, in the first selection process, the target selecting portion 105 selects the control value of a potential running lane demarcated by either the left or right lane marker that is closest to the host vehicle and the lane marker on the other side that is the nth closest to the host vehicle (where n is a predetermined integer of 2 or higher). However, in the first selection process, the target selecting portion 105 may alternatively select the control value of a potential running lane demarcated by either the left or right lane marker that is nth closest to the host vehicle (where n is a predetermined integer of 2 or higher) and the lane marker on the other side that is the mth closest to the host vehicle (where m is a predetermined integer of 2 or higher), taking into account the position of the tire mark described above on the road or the type of road sign described above or the like. In this case, n and m may be the same number or different numbers.

Also, in the lane marker recognition apparatus 1, the lane marker recognizing portion 102 may designate the difference in luminosity of the pixels in the image indicated by the image data as a characteristic amount, and the lane marker recognizing portion 102 may generate characteristic amount image data indicative of a characteristic amount image that indicates the characteristic amount by luminosity for each pixel that creates the image indicated by the image data. At this time, the lane marker recognizing portion 102 may also generate lane marker information that correlates, for each recognized lane marker, the position on the image of all of the pixels that indicate the lane markers recognized using a well-known method based on the image indicated by the characteristic amount image data with the characteristic amount of all of the pixels, and information indicative of whether the lane markers are to the left or the right of the host vehicle. That is, the lane marker recognizing portion 102 may generate lane marker information that also correlates with the characteristic amount of all of the pixels for each lane marker, as the lane marker information described in the first example embodiment. In this case, the target selecting portion 105 may select the potential running lane demarcated by the lane marker indicated by the pixels with the largest characteristic amount indicted by the lane marker information in the first selection process.

Also, the target selecting portion 105 may also select the potential running lane demarcated by the left and right lane markers that are farthest from the host vehicle in the first selection process. Accordingly, the control value of the potential running lane demarcated by a lane marker that indicates the boundary between the lane that the host vehicle is traveling in and the adjacent lane can be targeted for filtering, such that when the drive assist system 2 includes the lane departure warning device 201 or the like, processed information can be provided that enables the driver to be notified when the host vehicle is very likely veer into the adjacent lane.

Also, the lane marker recognition apparatus 1 may be such that the ordering described above is performed by the lane marker recognizing portion 102. At this time, the lane marker recognizing portion 102 generates lane marker information which, for each recognized lane marker, also correlates with the order of the lane markers in addition to the position on the image of all of the pixels indicating the recognized lane markers and the information indicating whether the lane markers are to the left or the right of the host vehicle. Then, the target selecting portion 105 selects the potential running lane as described above by the first selection process based on the order indicated by the lane marker information generated by the lane marker recognizing portion 102.

Also, the drive assist system 2 does not necessarily have to be provided with the lane departure warning device 201 and the lane keeping device 202 described above, or may be provided with other devices. In this case, the control information calculating portion 103 must at least calculate, for each potential running lane, the types of control values required by the devices in the drive assist system 2.

Furthermore, the filtering portion 104 may also generate information indicative of the unchanged control value that correlates with the running lane selected by the target selecting portion 105. Then, after the filtering portion 104 that receives a command for the potential running lane selected by the first selection process of the target selecting portion 105 has generated the information indicative of the unchanged control value of the potential running lane selected by the first selection process, and the target selecting portion 105 has obtained the lane marker information and the control information, the target selecting portion 105 may perform the second selection process in which it selects the potential running lane with the control value that is closest to the control value indicated by the information generated by the filtering portion 104, from among the potential running lanes indicated by the control information generated by the control information calculating portion 103. Then the filtering portion 104 generates information indicative of the unchanged control value of the potential running lane. Then after performing the first selection process, the target selecting portion 105 may repeat the second selection process as described above in the first example embodiment. Therefore, the target selecting portion 105 may select the control value of the selected potential running lane.

Also, in the lane marker recognition apparatus 1, the filtering portion 104 may calculate the processed value described above according to a method such as the least squares method or the moving average as the filter processing, and generate processed information indicative of the calculated processed value.

Also, in the first example embodiment, only a solid lane marker was described. However, the invention is not limited to this. For example, it is also possible to prevent the control value of a potential running lane demarcated by a false lane marker from being erroneously filtered even when the host vehicle is traveling in a lane demarcated by a lane marker that consists of a broken line or a lane demarcated by multiple lines which include a combination of lane marker consisting of a broken line and a lane marker consisting of a solid line.

Also, the functions of the lane marker recognizing portion 102, the control information calculating portion 103, the filtering portion 104, and the target selecting portion 105 may also be realized by predetermined program data which make it possible to execute processing procedures stored in a storage device (such as ROM, RAM, or a hard disk) being interpretively executed by an integrated circuit such as an LSI, CPU, or microcomputer. The integrated circuit may be, for example, an integrated circuit that forms an ECU housed in a movable object such as a vehicle. Also, in this case, the program data may be introduced into the storage device via a storage medium, and may be directly executed from this storage medium. Incidentally, the storage medium may be semiconductor memory such as ROM, RAM, or flash memory, magnetic disc memory such as a flexible disk or a hard disk, optical disk memory such as a CD-ROM, DVD, or BD, or a memory card or the like.

The invention described above will now be summarized.

The example embodiment of the invention described above relates to a lane marker recognition apparatus which recognizes a lane marker based on a captured image of a road surface in the direction in which a vehicle is traveling. This lane marker recognition apparatus includes recognizing means for recognizing at least one left lane marker and at least one right lane marker captured in the image, and generating lane marker information indicative of the recognized lane markers; calculating means for calculating, based on the lane marker information, at least one type of control value for each potential running lane demarcated by a combination of the at least one left lane marker and the at least one right lane marker; first selecting means for selecting a control value of one of the potential running lanes that is to be indicated as information based on the lane marker information, from among the control values for the potential running lanes calculated by the calculating means; generating means for generating information indicative of the selected control value; and second selecting means for, after the information has been generated, selecting the control value of the potential running lane that is closest to the control value indicated by the information, from among the control values calculated for the potential running lanes by the calculating means.

The generating means may include processing means for filtering the selected control value, and generating the information indicative of the filtered control value; and the second selecting means selects the control value of the potential running lane that is closest to the control value indicated by the information generated by the processing means, from among the control values calculated for the potential running lanes by the calculating means.

According to this structure, a control value calculated based on a false lane marker erroneously recognized as a lane marker due to noise in the image is not erroneously filtered so processed information indicative of a more accurate processed value can be generated.

The first selecting means may select the control value of the potential running lane demarcated by a predetermined given combination of the lane markers.

According to this structure, a combination of left and right lane markers of a running lane when calculating a control value to be filtered may be set in advance taking into account that the recognizing means may erroneously recognize a road sign or the like drawn on the surface of the road that the host vehicle is traveling on as a lane marker. Accordingly, a control value calculated based on a false lane marker will not be filtered.

The first selecting means may select the control value of the potential running lane demarcated by the combination of either the left or right lane marker that is closest to the vehicle and the lane marker on the other side that is nth closest to the vehicle (where n is an integer of 2 or higher).

According to this structure, a road sign of the like drawn on the surface of the road in a position relatively close to the left or the right of the vehicle will not be erroneously recognized as the left or right lane marker that is closest to the vehicle.

Thus, a control value calculated based on that road sign or the like erroneously recognized as a lane marker will not be filtered.

The first selecting means may select the control value of the potential running lane demarcated by the combination of the left lane marker that is closest to the vehicle and the right lane marker that is nth closest to the vehicle (where n is an integer of 2 or higher).

According to this structure, a road sign of the like drawn on the surface of the road in a position relatively close to the right lane marker to the right of the vehicle will not be erroneously recognized as the right lane marker that is closest to the vehicle. Thus, a control value calculated based on that road sign or the like erroneously recognized as a lane marker will not be filtered.

The first selecting means may select the control value of the potential running lane demarcated by the left lane marker that is closest to the vehicle and the right lane marker that is nth closest to the vehicle (where n is an integer of 2 or higher) when the number of the right lane markers is a predetermined number more than the number of the left lane markers.

According to this structure, when the vehicle is traveling in a specified lane of a road such as a passing lane in which the number of right lane markers is a predetermined number more than the number of left lane markers, a road sign or the like drawn in a position relatively close to the right lane marker will not be erroneously recognized as the right lane marker that is closest to the vehicle. Thus, a control value calculated based on that road sign or the like erroneously recognized as a lane marker will not be filtered. That is, even if the vehicle is traveling in a specified lane such as a passing lane, and the speed at which the host vehicle is traveling is relatively high compared to the speed at which a vehicle in the adjacent lane is traveling, a control value calculated based on the false lane marker will not be filtered.

The first selecting means may select the control value of the potential running lane demarcated by the left lane marker that is closest to the vehicle and the right lane marker that is second closest to the vehicle.

According to this structure, a road sign of the like drawn on the surface of the road in a position relatively close to the right lane marker to the right of the vehicle will not be erroneously recognized as the right lane marker that is closest to the vehicle. Thus, a control value calculated based on that road sign or the like erroneously recognized as a lane marker will not be filtered.

The first selecting means may select the control value of the potential running lane demarcated by the combination of the right lane marker that is closest to the vehicle and the left lane marker that is nth closest to the vehicle (where n is an integer of 2 or higher).

According to this structure, a road sign of the like drawn on the surface of the road in a position relatively close to the right lane marker to the right of the vehicle will not be erroneously recognized as the right lane marker that is closest to the vehicle. Thus, a control value calculated based on that road sign or the like erroneously recognized as a lane marker will not be filtered.

The first selecting means may select the control value of the potential running lane demarcated by the left lane marker that is closest to the vehicle and the right lane marker that is nth closest to the vehicle (where n is an integer of 2 or higher) when the number of the right lane markers is a predetermined number more than the number of the left lane markers.

According to this structure, when the vehicle is traveling in a specified lane of a road such as a passing lane in which the number of left lane markers is a predetermined number more than the number of right lane markers, a road sign or the like drawn in a position relatively close to the left lane marker will not be erroneously recognized as the left lane marker that is closest to the vehicle. Thus, a control value calculated based on that road sign or the like erroneously recognized as a lane marker will not be filtered. That is, even if the vehicle is traveling in a specified lane such as a passing lane, and the speed at which the host vehicle is traveling is relatively high compared to the speed at which a vehicle in the adjacent lane is traveling, a control value calculated based on the false lane marker will not be filtered.

The first selecting means may select the control value of the potential running lane demarcated by the right lane marker that is closest to the vehicle and the left lane marker that is second closest to the vehicle.

According to this structure, a road sign of the like drawn on the surface of the road in a position relatively close to the left lane marker to the left of the vehicle will not be erroneously recognized as the left lane marker that is closest to the vehicle. Thus, a control value calculated based on that road sign or the like erroneously recognized as a lane marker will not be filtered.

The first selecting means may select the control value of the potential running lane demarcated by a combination of the left lane marker that is farthest from the vehicle and the right lane marker that is farthest from the vehicle, from among the combinations of left and right lane markers.

Accordingly, it is possible to filter the control value of the potential running lane demarcated by left and right lane markers which indicate the boundary between the lane that the host vehicle is traveling in and an adjacent lane, and are farthest from the vehicle, from among the one or more right lane markers and the one or more left lane markers recognized by the recognizing means.

The calculating means may calculate, for each of the potential running lanes, the lane width indicated by the interval in the width direction between the left and right lane markers of the potential running lane as the control value.

According to this structure, the lane width can be filtered as the control value and information indicative of the filtered control value can be generated.

The calculating means may calculate, for each of the running lanes, the distance from the center in the width direction between the left and right lane markers of the potential running lane to the center of the vehicle in the width direction as the control value.

According to this structure, the distance (i.e., offset) in the width direction from the center of the lane in which the vehicle is traveling is filtered as the control value, and information indicative of the filtered control value can be generated.

The calculating means may calculate, for each of the potential running lanes, the curvature radius of the potential running lane as the control value.

According to this structure, the curvature radius of the lane in which the vehicle is traveling is filtered as the control value, and information indicative of the filtered control value can be generated.

The calculating means may calculate, for each of the potential running lanes, the yaw angle of the vehicle with respect to the direction of the potential running lane as the control value.

According to this structure, the yaw angle of the vehicle with respect to the direction of the lane in which the vehicle is traveling is filtered as the control value, and information indicative of the filtered control value can be generated.

The calculating means may calculate, for each of the potential running lanes, the pitch angle of the vehicle with respect to the road surface on which the left and right lane markers of the potential running lane are drawn as the control value.

According to this structure, the pitch angle of the vehicle with respect to the surface of the road on which the vehicle is traveling is filtered as the control value, and information indicative of the filtered control value can be generated.

The processing means may use a Kalman filter for the filtering process.

According to this structure, it is possible to generate information indicative of a filtered control value that is very accurate with respect to the actual value based on a control value with dispersion, and the control value that is closest to the generated information can be selected as the filtering target.

The processing means may use the least squares method for the filtering process.

According to this structure, a control value with dispersion can be smoothed, and the control value that is closest to the smoothed control value can be selected as the filtering target.

The processing means may use the moving average for the filtering process.

According to this structure, a control value with dispersion can be smoothed, and the control value that is closest to the smoothed control value can be selected as the filtering target.

This invention thus makes it possible to accurately recognize a lane marker on a road, and is effective as a lane marker recognition apparatus and the like mounted in a movable object such as a vehicle.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A lane marker recognition apparatus which recognizes a lane marker based on an image captured in a direction in which a vehicle is traveling, comprising:
   a recognizing device that recognizes one lane marker present on one of a left side and a right side of the vehicle and n lane markers present on the other of the left side and the right side of the vehicle, captured in the image, where n is an integer equal to or larger than two;
   a calculating portion that obtains combinations of the one lane marker with each of the n lane markers, with regard to multiple lane markers recognized by the recognizing device, as first to nth running lanes in ascending order of distance between the lane markers, and calculating control values regarding the respective first to nth running lanes;
   a first selecting portion which selects a predetermined running lane from among the second to nth running lanes as a selected running lane at a first timing; and
   a second selecting portion that selects a running lane that has a control value closest to the control value regarding the selected running lane, from among the first to nth running lanes, as a new selected running lane, at a second timing that differs from the first timing.

2. The lane marker recognition apparatus according to claim 1, further comprising:
   a processing portion that subjects the control values calculated by the calculating portion to a filtering process,
   wherein the second selecting portion uses the control values subjected to the filtering process by the processing portion as the control values of the first to nth running lanes.

3. The lane marker recognition apparatus according to claim 2, wherein the processing portion uses a Kalman filter for the filtering process.

4. The lane marker recognition apparatus according to claim 2, wherein the processing portion uses a least squares method for the filtering process.

5. The lane marker recognition apparatus according to claim 2, wherein the processing portion uses a moving average for the filtering process.

6. The lane marker recognition apparatus according to claim 1, wherein the calculating portion calculates, for each of the running lanes, a lane width indicated by an interval in a width direction between left and right lane markers of each running lane as the control value.

7. The lane marker recognition apparatus according to claim 1, wherein the calculating portion calculates, for each of the running lanes, a distance from a center in a width direction between left and right lane markers of each running lane to a center of the vehicle in the width direction as the control value.

8. The lane marker recognition apparatus according to claim 1, wherein the calculating portion calculates, for each of the running lanes, a curvature radius of each running lane as the control value.

9. The lane marker recognition apparatus according to claim 1, wherein the calculating portion calculates, for each of the running lanes, a yaw angle of the vehicle with respect to a direction of each running lane as the control value.

10. The lane marker recognition apparatus according to claim 1, wherein the calculating portion calculates, for each of the running lanes, a pitch angle of the vehicle with respect to a road surface on which left and right lane markers of each running lane are drawn as the control value.

11. A lane marker recognition method executed by a lane marker recognition apparatus which recognizes a lane marker based on an image captured in a direction in which a vehicle is traveling, comprising:
   recognizing one lane marker present on one of a left side and a right side of the vehicle and n lane markers present on the other of the left side and the right side of the vehicle, captured in the image, where n is an integer equal to or larger than two;
   obtaining combinations of the one lane marker with each of the n lane markers, with regard to recognized multiple lane markers, as first to nth running lanes in ascending order of distance between the lane markers, and calculating control values indicating characteristics of the running lanes, regarding the first to nth running lanes;
   selecting a predetermined running lane from among the second to nth running lanes as a selected running lane at a first timing; and
   selecting a running lane that has a control value closest to the control value regarding the selected running lane, from among the first to nth running lanes, as a new selected running lane, at a second timing that differs from the first timing.

* * * * *